Jan. 4, 1955     O. O. DALE ET AL     2,698,678
HELICAL SPRING CLUTCH

Filed July 18, 1951     2 Sheets-Sheet 1

Orie O. Dale
Albert B. Menkens
INVENTORS.

BY John D. Chesnut
ATTORNEY

Jan. 4, 1955    O. O. DALE ET AL    2,698,678
HELICAL SPRING CLUTCH

Filed July 18, 1951    2 Sheets-Sheet 2

Orie O. Dale
Albert B. Menkens
INVENTORS.

BY John D. Chesnut
ATTORNEY

United States Patent Office 2,698,678
Patented Jan. 4, 1955

2,698,678

HELICAL SPRING CLUTCH

Orie O. Dale and Albert B. Menkens, Long Beach, Calif.

Application July 18, 1951, Serial No. 237,404

4 Claims. (Cl. 192—41)

This invention relates to friction clutches of the type wherein a helical spring driving member is expanded or contracted to make frictional engagement with a housing or shaft to be driven. More particularly, the invention relates to helical spring clutches of the type wherein both the helical spring and the driven member are tapered and are normally in engaged position.

The invention is intended for use in service where positive, jaw type clutches are used and should not be confused with friction clutches of the type which engage a load gradually, through the medium of slipping clutch members.

We are aware that tapered, helical spring friction clutches have been used heretofore, but their use has been limited because of the tendency of the spring to score or gall the housing or shaft during the engaging movement which takes place over a substantial distance and throughout an appreciable time interval.

The object of the present invention is to provide a clutch of the helical spring type which engages or disengages positively, in any rotary position, with a very slight movement and substantially no slippage.

Another object is to provide a clutch which is easily and quickly engaged or disengaged by a relatively small pressure applied to one end of the helical spring, regardless of whether the clutch is under full load or turning at full speed.

Other objects and advantages will be apparent from the following description and drawings, wherein.

Figure 1:
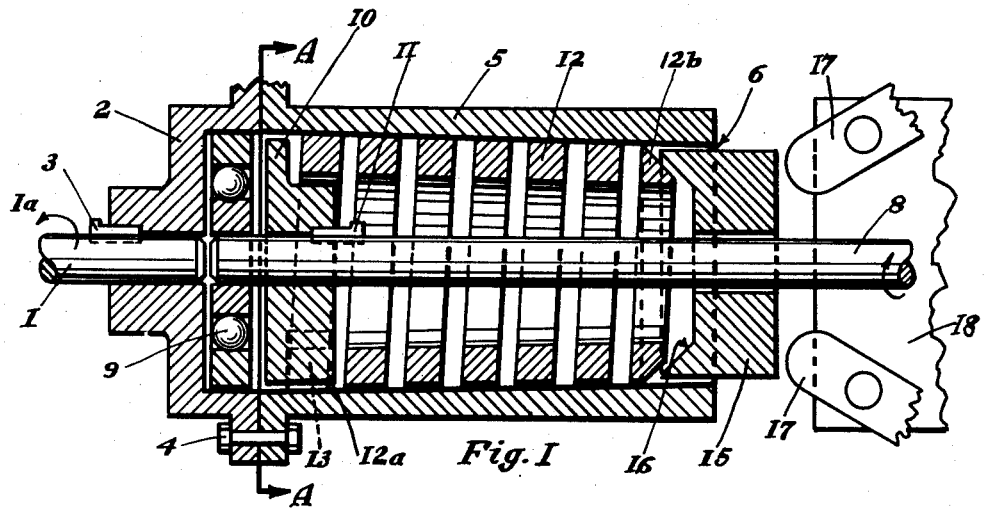
Fig. 1 is a horizontal cross section of one form of our invention, showing the clutch in driving engagement.
Figure 2:
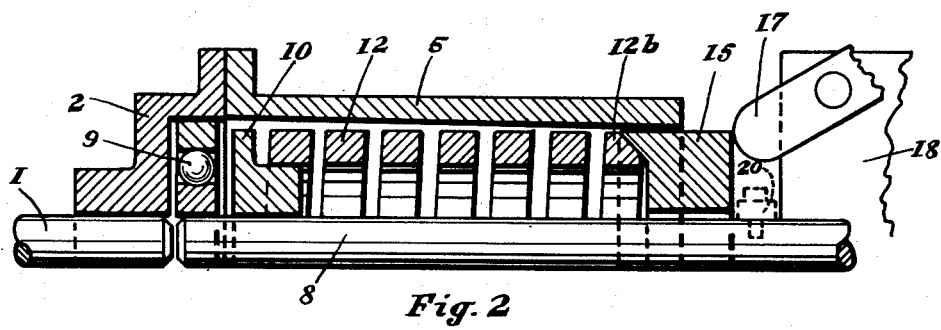
Fig. 2 shows the clutch of Figure 1 released from driving engagement.
Figure 3:
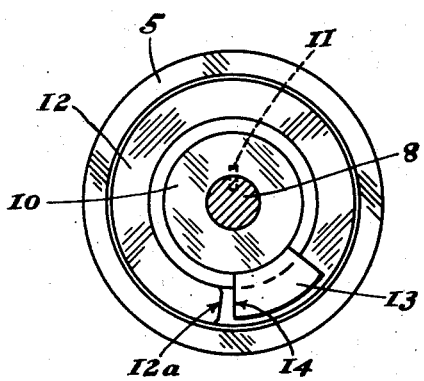
Fig. 3 is a cross section taken on line A—A of Figure 1 showing the driving connection between the spring and driven shaft.
Figure 3A:
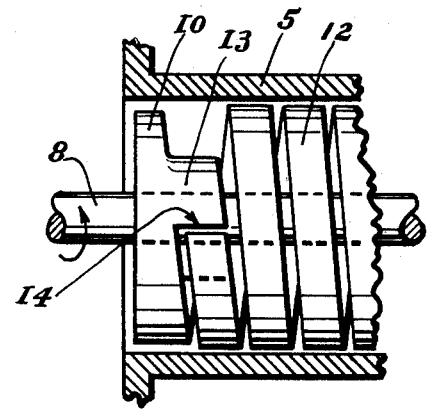
Fig. 3A is a horizontal elevation, partly in section, of the driving connection between the end of the spring and the drive collar shown in Figures 1, 2 and 3.

Referring to Figures 1, 2 and 3, a drive shaft 1, adapted for left-hand rotation, as indicated by the arrow 1a is secured to a cylindrical drive member 2 by means of a key 3. Attached to the drive member 2 by means of bolts 4 is a cylindrical housing 5 having its opposite end 6 open. A driven shaft 8 extends within the housing 5 with its inner end adjacent to and in line with the end of the drive shaft 1. The inner end of the driven shaft 8 is preferably, but not necessarily, supported by an anti-friction bearing 9 mounted in the drive member 2. Mounted upon the driven shaft 8 adjacent the bearing 9 is driven collar 10 secured to the driven shaft by a key 11. A helical coil spring 12 is positioned around the driven shaft 8 with one end 12a in driving engagement with a lug 13 on the driven collar and having a driving face 14 thereon. The opposite, or smaller, end 12b of the spring 12 engages a friction collar 15 loosely mounted on the driven shaft for relative rotation and axial reciprocation with respect thereto and similarly loosely mounted within the open end of the housing 5. The inner face of the friction collar 15 is preferably, although not necessarily, bevelled as indicated at 16 to engage a similar bevel on the free end of the helical spring. The friction collar 15 is forced against the spring 12 by any conventional means such as the pivoted cams 17 mounted on a stationary support 18.

The novelty in the present design resides in the particular configuration of the frictional engaging surfaces of the spring 12 and the driving housing 5 and the assembly thereof, as hereinafter described.

Figure 4:
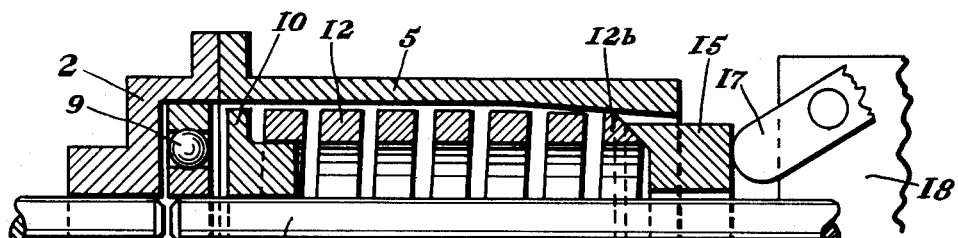
Fig. 4 is a fragmentary cross section of a modification of the clutch shown in Figure 1 wherein the clearance between the spring and drive housing is partly of constant width and partly of decreasing width.

The interior surface of the driving housing is tapered radially inward in a direction away from its drive member 2 and toward its open end 6. The degree of taper is not critical. The taper may extend for the entire length of the spring, as shown in Figures 1 and 2 or it may extend for only a short distance, say two or three coils, from the smaller end of the spring, as shown in Figure 4.

The exterior surface of the helical spring 12 is likewise tapered radially inward from its end 12a of larger diameter toward its smaller end 12b on an angle to the axis of the shaft 8 which is slightly less than that of the housing 5. Thus the clearance between the interior of the housing 5 and the exterior of the spring 12 increases from the smaller driven end 12b toward the larger, driving end 12a of the spring.

It is not necessary that both the spring and housing be tapered. The frictionally engaging surface of either member could be parallel to the axis of rotation, with the taper on the other member. It is only necessary that there be a diverging clearance between the two members.

The helical spring 12, when extended freely, is too long to fit into the tapered housing 5. In order to assemble the clutch it is preferable to first compress the spring 12. This is done by placing a removable stop 20 on the shaft 8 adapted to prevent movement of the collar 15 toward the cam members 17. When the bolts 4 are tightened, the spring 12 is compressed and remains free from contact with the inner surface of the housing 5. When the temporary stop 20 is removed, the spring 12 elongates until the coil at the smaller end 12b engages the inner surface of the housing 5. When this occurs, and there is any drag causing the driven member to tend to lag behind the driving member, the helical spring tends to unwind, thereby increasing in diameter and seizing the housing throughout its length as shown in Figure 1. The greater the resistance to turning, the greater the frictional grip between the spring and the housing, similar to the action of a self-energizing brake.

It will be observed that our clutch is normally engaged. In order to disengage the clutch, the collar 15 is pressed against the smaller end of the tapered spring 12. A very little pressure and very slight movement of the end 12b of the spring disengages such end from the reduced end of the driving housing 5, thus permitting the remaining turns to free themselves from contact with the housing 5 as shown in Figure 2. The disengagement is practically instantaneous with little, if any, frictional slip between the spring and the housing. The amount of pressure required to release the spring from the housing is determined by the amount of pre-compression placed on the spring during assembly and is independent of the load on the clutch or the speed of rotation.

When it is desired to re-engage the clutch it is necessary only to release the collar 15, allowing the spring 12 to elongate until the small end of the coil again engages the inner surface of the housing 5. When torque is applied contact causes the spring to expand radially outward, throughout its length, gripping the housing with a force which increases with the resistance to turning. The engaging movement of the spring is very slight and the engagement is practically instantaneous, owing to the difference in the tapers between the outside diameter of the spring and the inside diameter of the housing. Thus there is very little opportunity for the spring and housing to slip or become scored or galled.

Likewise, it will be apparent that our clutch can be engaged or disengaged in any rotative position and under full load or at full rotative speed.

A particular advantage inherent in the design of our clutch is the ability to handle heavy loads with a clutch of small over-all dimensions. The load-carrying capacity of the clutch approximates the compressive strength of a cross section of the spring. It is assumed, in this connection that a sufficient number of coils are employed in order to provide a frictional engaging area of spring and housing to carry the load without slipping.

Fig. 4 illustrates a modification of the clutch shown in Figures 1 and 2. In Fig. 4 the clearance between the spring and the case does not increase constantly in width from the driven end toward the driving end of the spring. Instead, the width of the clearance at the driven end of the spring increases toward the driving end for a distance of only two or three coils, as indicated at a—b. Beyond that point the clearance is constant throughout the distance b—c. The clearance at b—c can be either parallel to the shaft axis or inclined at an angle thereto, as in Figures 1 and 2.

It should be noted that although the action of the clutches shown and described above is practically instantaneous, with little or no slipping or cushioning effect, it is possible to provide some cushioning by increasing the width of the clearance between the spring and the housing.

Figure 5:
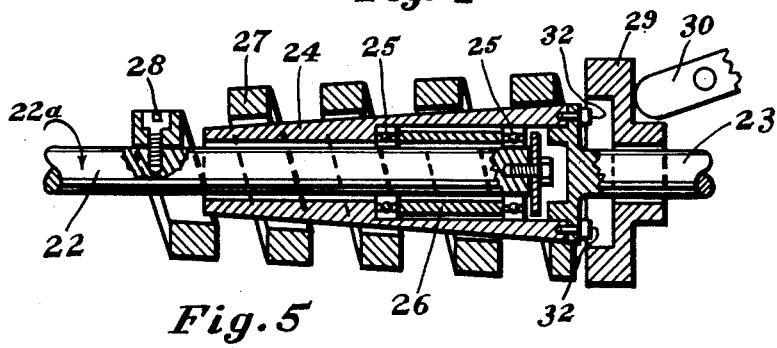
Fig. 5 is a horizontal cross section of another embodiment of the invention wherein the helical spring which is normally expanded longitudinally and contracted radially in frictional engagement with the exterior surface of a driven housing, is compressed longitudinally to free it from engagement with the housing.

Fig. 5 illustrates another embodiment of our invention wherein the spring is compressed longitudinally and contracted radially upon the exterior surface of a driven housing.

The drive shaft is indicated at 22 and is adapted for right hand rotation as indicated by the arrow 22a. The driven shaft is indicated at 23. A cylindrical housing 24 is secured to one end of shaft 23 and extends around the end of shaft 22 in clearance relation thereto. Antifriction bearings 25 may be interposed between the shaft 22 and housing 24 if desired. The antifriction bearings are shown separated by a spacer sleeve 26. A helical spring 27 surrounds the housing 24 with one end engaged in driving relation with the shaft 23 as by means of the set screw 28. The opposite end of the spring 27 frictionally engages a collar 29 slidably and rotatably mounted on the driven shaft 23. The collar 29 is adapted to be pressed against the adjacent end of the coil spring 27 as by means of cams 30.

The exterior surface of the housing 24 is conical, with its end of larger diameter attached to the driven shaft 23, as by means of bolts 32.

The helical coil spring 27 is wound spirally on a taper approximating the taper on the exterior surface of the housing 24 but with a decreasing clearance from the fixed end 28 of the spring toward its free end. The free length of the spring 27 is such that the spring must be partially compressed when assembled on the housing 24 and shaft 22, thus providing frictional engagement between the coil at the free end of the spring and the large diameter end of the housing 24. When shaft 22 is rotated in a right hand direction, as indicated by the arrow 22a, the spring 27 is subjected to tension and tends to contract against the housing 24 throughout its length and to drive the housing by frictional engagement.

When it is desired to disengage the clutch, the collar 29 is pressed by the cams 30 against the free, adjacent end of the coil spring 27. Because of the slight difference in tapers between the spring and housing, a very slight axial movement of the free end of spring 27 will free it from frictional contact with the housing 24, and at the same time permit the other coils to unwind and free them from contact with the housing. Release of the cam pressure will permit the spring 27 to elongate and re-engage the housing 24.

It should be noted that all of clutches described above can be driven from either end shaft, but that the direction of rotation must be reversed. For example, if the clutch shown in Figs. 1 and 2 were driven from the shaft 8, the shaft would have to turn in a right hand direction and shaft 1 would turn in the same direction. In Figure 5 the shaft 23 could be the driving shaft if it were rotated in a left hand direction.

While the foregoing description illustrates the preferred embodiment of our invention, it is obvious that various modifications may be made within the scope of the following claims.

We claim:

1. In a helical spring clutch, a rotary drive member, a rotary driven member in alignment with and adjacent to said drive member, a cylindrical housing attached to one of said members and enclosing one end of the other of said members, a helical coil spring surrounding one of said members and adapted for slight axial movement with respect thereto, said spring normally being partially compressed and in frictional engagement with a surface of said cylindrical housing, an abutment on one of said members adapted to drive against one end of said helical coil spring, a collar slidable axially on one of said members and adapted to frictionally engage the free end of said helical coil spring at the end opposite to said abutment, means for moving said collar in an axial direction to further compress said spring, the frictionally engaging surfaces of said housing and spring having an increasing clearance throughout at least a portion of their lengths such that axial movement of the free end of said spring in a direction to further compress said spring in an axial direction results in separation of the frictionally engaged surfaces on said spring and housing.

2. In a helical spring clutch, a rotary drive member, a rotary driven member in alignment with and adjacent said drive member, a cylindrical housing attached to one of said members and enclosing one end of the other of said members, a helical coil spring surrounding one of said members and adapted for slight axial movement with respect thereto, said spring normally being partially compressed and in frictional engagement with the interior surface of said cylindrical housing, an abutment on one of said members adapted to drive against one end of said helical coil spring in the direction in which the spring is wound thereby causing said spring to tend to expand radially and to grip the interior surface of said housing more tightly, a collar slidable axially on one of said members and adapted to frictionally engage the free end of said helical coil spring at the end opposite to said abutment, means for moving said collar in an axial direction to further compress said spring, the frictionally engaging surfaces of said housing and spring having an increasing clearance throughout at least a portion of their lengths such that axial movement of the free end of said spring in a direction to further compress said spring in an axial direction results in separation of the frictionally engaged surfaces on said spring and housing.

3. In a helical spring clutch, a rotary drive member, a rotary driven member in alignment with and adjacent said drive member, a cylindrical housing attached to said drive member for rotation therewith and enclosing one end of said driven member and having an interior surface for friction engagement, a helical coil spring surrounding one end of said driven member and adapted for slight axial movement with respect thereto, said spring normally being partially compressed and having an exterior surface for frictional engagement with the interior surface of said cylindrical housing, an abutment on said driven member adapted to drive against one end of said helical coil spring in the direction in which the spring is wound thereby causing said spring to tend to expand radially and to grip the interior of said housing more tightly, a collar slidable axially on said driven member and adapted to frictionally engage the free end of said helical coil spring at the end opposite to said abutment, means for moving said collar in an axial direction to further compress said spring, the frictionally engaging surfaces on the interior of said housing and the exterior of said spring having an increasing clearance throughout at least a portion of their lengths such that axial movement of the free end of said spring in a direction to further compress said spring in an axial direction results in separation of the frictionally engaged surfaces on said spring and housing.

4. In a helical spring clutch, a rotary drive member, a rotary driven member in alignment with and adjacent said drive member, a cylindrical housing attached to one of said members and enclosing one end of the other of said members, a helical coil spring surrounding one of said members and adapted for slight axial movement with respect thereto, said spring normally being partially compressed with its interior surface in frictional engagement with the exterior surface of said cylindrical housing, one end of said helical spring being attached to one of said drive members for rotation therewith, a collar slidable axially on one of said members and adapted to frictionally engage the free end of said helical coil spring at the free end thereof, means for moving said collar in an axial direction to further compress said spring, the frictionally engaging surfaces of said housing and spring having an increasing clearance throughout at least a portion of their lengths such that axial movement of the free end of said spring in a direction to further compress it in an axial direction results in separation of the frictionally engaged surfaces on said spring and housing.

References Cited in the file of this patent

UNITED STATES PATENTS

| Number | Name | Date |
|---|---|---|
| 1,611,898 | Drexler | Dec. 28, 1926 |
| 1,718,197 | Starkey | June 18, 1929 |
| 1,940,880 | Pitter | Dec. 26, 1933 |
| 2,105,330 | Pagenkopf | Jan. 11, 1938 |

FOREIGN PATENTS

| 115,746 | Great Britain | May 28, 1918 |